United States Patent
Oscarsson et al.

(10) Patent No.: US 9,903,967 B2
(45) Date of Patent: *Feb. 27, 2018

(54) LOW-FREQUENCY MAGNETIC RELUCTANCE MARINE SEISMIC SOURCE

(71) Applicant: PGS Geophysical AS, Oslo (NO)

(72) Inventors: Mattias Oscarsson, Oslo (NO); Oeystein Traetten, Asker (NO); Rune Voldsbekk, Drammen (NO); Rune Toennessen, Lommedalen (NO)

(73) Assignee: PGS Geophysical AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,540

(22) Filed: Jan. 31, 2017

(65) Prior Publication Data

US 2017/0153341 A1 Jun. 1, 2017

Related U.S. Application Data

(63) Continuation of application No. 14/536,190, filed on Nov. 7, 2014, now Pat. No. 9,606,252.

(60) Provisional application No. 61/920,141, filed on Dec. 23, 2013.

(51) Int. Cl.
*G01V 1/38* (2006.01)
*B06B 1/04* (2006.01)
*G01V 1/02* (2006.01)

(52) U.S. Cl.
CPC .............. *G01V 1/159* (2013.01); *B06B 1/045* (2013.01); *G01V 1/3808* (2013.01); *B06B 2201/53* (2013.01)

(58) Field of Classification Search
CPC ...... G01V 1/159; G01V 1/3808; B06B 1/045; B06B 2201/53

USPC ............................................ 367/15, 25, 168
See application file for complete search history.

(56) References Cited

U.S. PATENT DOCUMENTS

| | | |
|---|---|---|
| 2,116,522 A | 5/1938 | Kunze |
| 2,419,196 A | 4/1947 | Benioff |
| 2,517,565 A | 8/1950 | Hayes |
| 3,193,460 A | 7/1965 | Krabbe |
| 3,308,423 A | 3/1967 | Massa |
| 5,126,979 A | 6/1992 | Rowe, Jr. et al. |
| 5,268,879 A | 12/1993 | Flanagan |
| 5,646,380 A | 7/1997 | Vaage |
| 8,335,126 B2 | 12/2012 | Sudow et al. |

(Continued)

FOREIGN PATENT DOCUMENTS

JP 06003458 1/1994

OTHER PUBLICATIONS

European Extended Search report dated Jun. 8, 2015, in the prosecution of patent application No. 14198113.4, 7 pages.

*Primary Examiner* — Daniel L Murphy

(57) ABSTRACT

This disclosure is related to marine seismic sources, for example marine seismic sources known in the art as benders. Some embodiments of this disclosure use magnetic reluctance forces to produce seismic energy. For example, pole pieces may be attached to one or more plates of a marine seismic source, and a wire coil may induce an attractive force between the pole pieces to cause deformation of the plates to produce seismic energy. Such marine seismic sources may be components of a marine seismic survey system, and may be used in a method of marine seismic surveying. Methods of making marine seismic sources are also disclosed.

26 Claims, 9 Drawing Sheets

(56) References Cited

U.S. PATENT DOCUMENTS

| | | |
|---|---|---|
| 9,158,019 B2 | 10/2015 | Bagaini |
| 9,606,252 B2 * | 3/2017 | Oscarsson .............. G01V 1/159 |
| 2008/0123471 A1 | 5/2008 | Rode et al. |
| 2008/0228403 A1 | 9/2008 | Robertsson |
| 2009/0086574 A1 | 4/2009 | Scott et al. |
| 2009/0236937 A1 | 9/2009 | Shiba |
| 2009/0268554 A1 | 10/2009 | Armstrong |
| 2011/0317515 A1 | 12/2011 | Tenghamn |
| 2012/0051188 A1 | 3/2012 | Graber |
| 2012/0280516 A1 | 11/2012 | Moss |
| 2013/0037342 A1 | 2/2013 | Engdahl |
| 2013/0044565 A1 | 2/2013 | Barr et al. |
| 2014/0241117 A1 | 8/2014 | Dellinger |

* cited by examiner

LOW-FREQUENCY MAGNETIC RELUCTANCE MARINE SEISMIC SOURCE

CROSS-REFERENCE TO RELATED APPLICATIONS

This application is a continuation of application Ser. No. 14/536,190 filed Nov. 7, 2014 titled, "Low-Frequency Magnetic Reluctance Marine Seismic Source", which claims the benefit of Provisional Patent Application No. 61/920,141, filed Dec. 23, 2013. Both applications are incorporated by reference herein as if reproduced in full below.

BACKGROUND

In the oil and gas exploration industry, marine geophysical prospecting is commonly used in the search for hydrocarbon-bearing subterranean formations. Marine geophysical prospecting techniques may yield knowledge of the subsurface structure of the Earth, which is useful for finding and extracting hydrocarbon deposits such as oil and natural gas. Seismic surveying is one of the well-known techniques of marine geophysical prospecting.

In some instances of seismic surveying conducted in a marine environment (which may include saltwater, freshwater, and/or brackish water environments), one or more marine seismic sources are typically configured to be submerged and towed by a vessel. The vessel is typically also configured to tow one or more laterally spaced streamers through the water. At selected times, control equipment may cause the one or more marine seismic sources to actuate. Seismic signals may then be received by sensors disposed along the streamers. Data collected during such a seismic survey may be analyzed to assist identification of hydrocarbon-bearing geological structures, and thus determine where deposits of oil and natural gas may be located.

DETAILED DESCRIPTION

Figure 1:
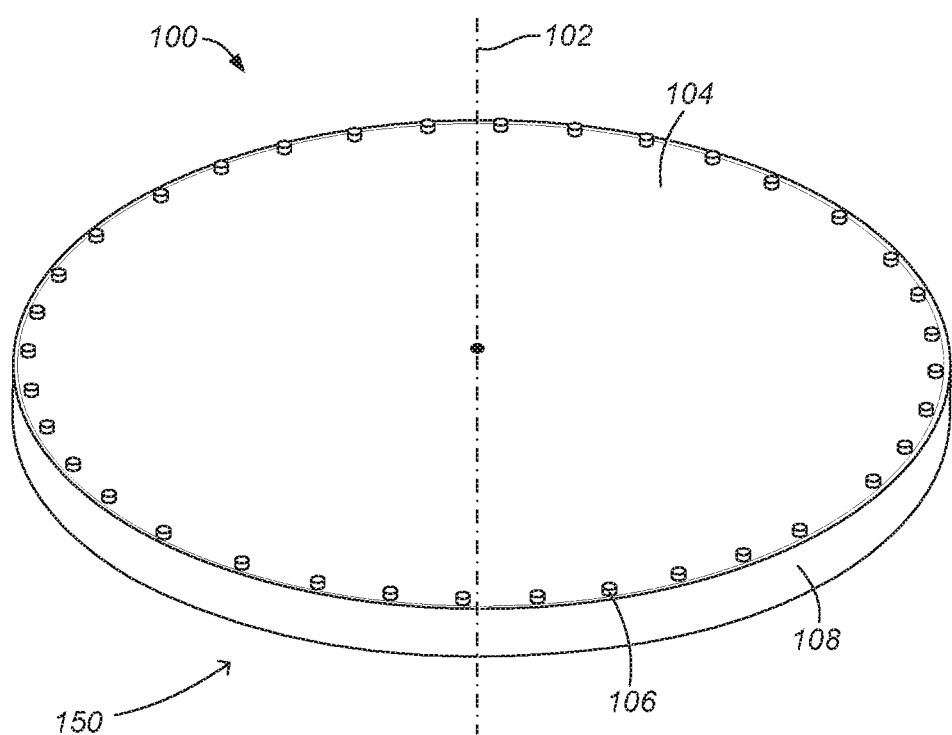
FIG. 1 illustrates an embodiment of a marine seismic source according to this disclosure.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to," "usable to," or "operable to" perform a task or tasks. In such contexts, "configured to," "usable to," and "operable to" are each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to," "usable to," or "operable to" language may include electronic hardware—for example, circuits, memory storing program instructions executable to implement the operation, etc.—mechanical devices, or other types of structure. Reciting that a device/unit/circuit/component is "configured to," "usable to," or "operable to" perform one or more tasks is expressly intended not to invoke 35 U.S.C. §112(f), for that device/unit/circuit/component.

In some embodiments, various items of information relating to seismic surveying may be embodied in a geophysical data product. A "geophysical data product" may be stored on a computer-readable, non-transitory medium and may embody geophysical data (such as raw streamer data, processed streamer data, two- or three-dimensional maps based on streamer data, etc.). Some non-limiting examples of computer-readable media may include hard drives, CDs, DVDs, print-outs, etc. In some embodiments, raw analog data from streamers may be stored as a geophysical data product. In other instances, the data may first be digitized and/or conditioned prior to being stored as the geophysical data product. In yet other instances, the data may be fully processed into a two- or three-dimensional map of the various geophysical structures before being stored in the geophysical data product. The geophysical data product may be produced offshore (e.g., by equipment on a vessel) or onshore (e.g., at a facility on land) either within the United States or in another country. If the geophysical data product is produced offshore or in another country, it may be imported onshore to a facility in the United States. Once onshore in the United States, geophysical analysis may be performed on the geophysical data product.

In some instances of a typical marine seismic survey, one or more marine seismic sources may be used to generate seismic energy. The seismic energy may travel downward through the water and through the formations underlying the water bottom. Impedance boundaries within the subsea formations may reflect (at least in part) the seismic energy that travels through such formations. The reflected seismic energy may then travel upwards. Geophysical sensors (e.g., hydrophones, geophones, accelerometers, etc.) may capture such reflected seismic energy. These geophysical sensors may convert the captured seismic energy into signals, such as optical or electrical signals. The electrical or optical signals may then be interpreted to provide information as to the composition and/or structure of the various subsurface formations under the water bottom. Such information may be used, for example, to determine the possibility that such formations may contain mineral deposits including hydrocarbons.

One type of marine seismic source that may be used in seismic surveying operations is a flexural disc projector, commonly known as a "bender." A typical bender may employ one or more piezoelectric elements, such that the mechanical vibration of the bender is driven by piezoelectric distortion based on electrical energy applied to the piezoelectric element. For example, when electrical energy (e.g., a voltage) is applied to a piezoelectric material, a volume or length of the piezoelectric element may increase or decrease in response. This phenomenon is generally termed the "inverse piezoelectric effect," and it may be exploited in order to produce seismic energy. For example, a piezoelectric element may be attached (e.g., glued) to a portion of a marine seismic source, such that the contractions and/or expansions of the piezoelectric element may cause deformations in the portion, and the deformations may cause seismic energy to be transmitted through the water.

However, although common, typical piezoelectric benders may be subject to various disadvantages in some cases. For example, they are often labor-intensive and expensive to produce. Further, large piezoelectrics may be especially difficult to produce, which can effectively limit the size of piezoelectric benders. Piezoelectric elements may also be prone to cracking, as well as being sensitive to pressure variations. Accordingly, as described more fully below, some embodiments of this disclosure include marine seismic sources that use the magnetic reluctance force (e.g., the force experienced due to a material's magnetic reluctance in the presence of magnetic flux) to produce seismic energy. This new technique may ameliorate some of the difficulties that have arisen with piezoelectric marine seismic sources. For example, a relatively large force or pressure between the plates of a bender (and thus relatively high-amplitude seismic energy) may be achieved with a relatively low-mass bender. Various other advantages will also become clear with the benefit of this disclosure.

When seismic energy travels through water and subsea formations, higher frequency seismic energy may typically be attenuated more rapidly than lower frequency waves. Accordingly, seismic energy at lower frequencies (for example, infrasound) may typically be transmitted over longer distances through water and subsea formations than higher frequency seismic energy. A marine seismic source that produces seismic energy at lower frequencies may thus have utility in marine seismic surveys, particularly those conducted in increased water depths.

The design parameters for a marine seismic source may include, among others, seismic energy output within a low frequency range (e.g., between 2 Hz and 20 Hz, or between 2 Hz and 10 Hz), water depth, weight, size and cost. For example, it may be advantageous for a marine seismic source to be capable of supplying broadband low-frequency energy, e.g., such that the frequency spectrum may be changed as desired according to the geophysical properties in a survey. As modern marine seismic surveys continue to explore waters at increased depths, there is a continuing need for a low cost (for example, both in terms of manufacturing cost and operating cost) marine seismic source that produces high seismic energy at lower frequencies, particularly at frequencies in the range of approximately 2 Hz to 10 Hz. Some embodiments of this disclosure are particularly applicable in this frequency range, although other embodiments are operable in larger ranges, such as 2 Hz to 20 kHz.

In the context of a low-frequency source (which generally refers to a source outputting a frequency in the range of 2-10 Hz), it may be advantageous to tow the source at a depth of approximately $\lambda/4$, where $\lambda$ is the wavelength of the seismic energy being output by the low-frequency source. For example, since seawater has a sound velocity of approximately 1,500 meters/second, $\lambda/4$ for a 5 Hz source would be approximately 75 meters. For a frequency in the range of 2-10 Hz, $\lambda/4$ would be between approximately 35 and 190 meters. For a frequency in the range of 2-20 Hz, $\lambda/4$ would be between approximately 15 and 190 meters.

Turning now to FIG. 1, an exemplary illustration of marine seismic source 100 is shown. As shown, marine seismic source 100 may be in the form of an electromechanical device such as a bender. It should be noted that FIG. 1 (as well as the rest of the Figures) may not necessarily be drawn to scale. In some embodiments, a marine seismic source according to this disclosure may have a larger or a smaller height relative to its diameter.

Marine seismic source 100 in this embodiment is generally cylindrical, and it is arranged about axis 102. Marine seismic source 100 includes top plate 104, as well as a corresponding bottom plate 150 (not shown due to the perspective of FIG. 1). These plates are held in place via fasteners 106 (such as bolts), which connect them to hoop 108. Hoop 108 extends around the circumference of marine seismic source 100 and provides a desired separation between top plate 104 and bottom plate 150. Hoop 108 may also provide a fixed contact against which top plate 104 and bottom plate 150 can flex inwardly and/or outwardly.

One of ordinary skill in the art with the benefit of this disclosure will understand that the references to "top" and "bottom" plate are not intended to indicate that the top plate must necessarily be above the bottom plate. These designations are instead intended only to simplify the descriptions of the drawings in this disclosure. In embodiments of marine seismic sources according to this disclosure, the "top" and "bottom" plates may be in any desired physical orientation relative to one another.

An interior cavity may be formed between top plate 104 and bottom plate 150, and this interior cavity may be configured to contain a volume of gas (such as air, nitrogen, or any other suitable substance). In some embodiments, the volume of gas within the interior cavity may be pressurized. In marine applications, pressurizing and maintaining the volume of gas within the interior cavity at an ambient hydrostatic pressure at a selected operating water depth may protect marine seismic source 100 from collapsing from the ambient hydrostatic pressure.

Plates 104 and 150 may each be of a circular shape, an elliptical shape, or some other shape. Plates 104 and 150 may be made from a material such as metal (e.g., aluminum, steel, etc.). Plates 104 and 150 may be made from the same material in one embodiment. Yet in another embodiment, they may be made from different materials.

Not shown in FIG. 1, various types of circuitry and components may be used to produce seismic energy by causing top plate 104 and/or bottom plate 150 to move. As noted above, one possibility is the use of one or more piezoelectric elements (e.g., piezoelectric ceramics glued to the interior or exterior surfaces of the plates). In accordance with this disclosure, however, pole pieces, wire coils, etc. may in some embodiments also be used to cause marine seismic source 100 to produce seismic energy.

Figure 2A:
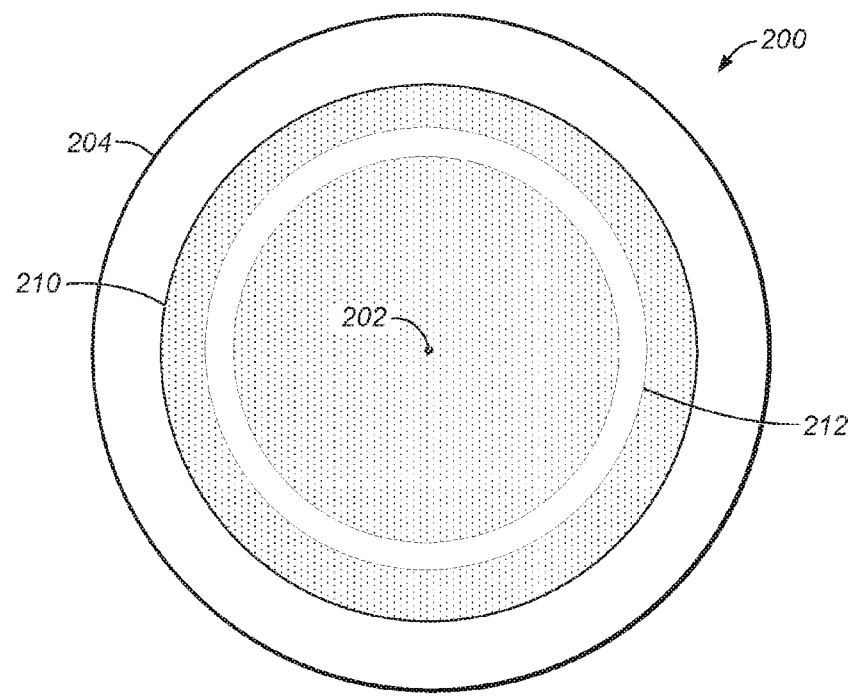
FIGS. 2A-2B illustrate a disassembled view of an embodiment of a marine seismic source according to this disclosure.
Figure 2B:
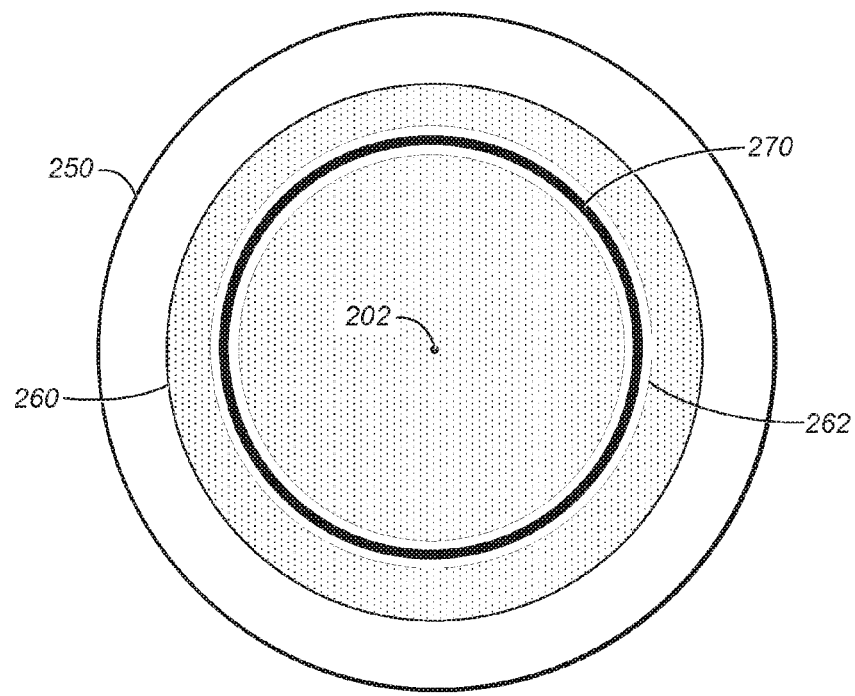

Turning now to FIGS. 2A and 2B, views are shown respectively of top plate 204 and bottom plate 250 of marine seismic source 200. A hoop operable to connect these two plates (e.g., corresponding to hoop 108 in FIG. 1) is not shown, and axis 202 is shown as passing through both top plate 204 and bottom plate 250. When assembled, top plate 204 and bottom plate 250 would be aligned along axis 202.

Top plate 204 in this embodiment includes pole piece 210 attached thereto. Pole piece 210 may typically be made of a ferromagnetic material. In this embodiment, pole piece 210 is shaped as a disk arranged concentrically with top plate 204. Pole piece 210 may further include groove 212, which will be discussed in more detail below. In some embodiments, pole piece 210 may be attached to the bottom surface of top plate 204. In other embodiments, pole piece 210 may extend at least partially through the interior of top plate 204, being magnetically accessible to the bottom surface of top plate 204. Pole piece 210 may be any suitable type of pole piece, such as iron, steel, cobalt, various alloys, and/or any other material having suitable magnetic properties.

Bottom plate 250 is shown with pole piece 260 positioned such that it would be adjacent to pole piece 210 in the assembled device. In some embodiments, pole piece 260 may be attached to the top surface of bottom plate 250. In other embodiments, pole piece 260 may extend at least partially through the interior of bottom plate 250, being magnetically accessible to the top surface of bottom plate 250. Similar to groove 212 in pole piece 210, pole piece 260 may include groove 262. Grooves 212 and 262 are arranged in this embodiment such that they would be adjacent to one another in the assembled device. Wire coil 270 in this embodiment is disposed within groove 262 of pole piece 260. One of ordinary skill in the art will understand that in some embodiments, wire coil 270 may be of sufficient diameter that in the assembled device it may extend at least partially into groove 212. In other embodiments, wire coil 270 may be entirely contained within groove 262, while in yet other embodiments, wire coil 270 may be entirely contained within groove 212. In some such cases, one or the other of grooves 212 and 262 may even be omitted entirely.

Accordingly, in some cases top plate 204 and bottom plate 250 may be substantially identical to one another. In some cases, however, they may be different in various ways. In the embodiment shown, for example, grooves 212 and 262 may line up with one another in the assembled device to form a channel through which wire coil 270 may run. Wire coil 270 may consist of a single loop of wire or multiple loops of wire, as appropriate. Various electronic components, not shown in FIGS. 2A and 2B, may be used to supply electrical energy to wire coil 270.

Pole pieces 210 and 260 and/or wire coil 270 may in some embodiments be attached by an adhesive, such as epoxy, or they may be bolted in place, or they may be attached via any other suitable means. There is no limitation as to how such components may be attached to plates 204 and 250. As used herein, the words "attach," or "attached" (and other derivations thereof) should be understood to mean a connection between components, whether direct or indirect. Further, in some embodiments, wire coil 270 may simply be placed in a groove without being attached.

When electrical energy is supplied to wire coil 270, this may cause top plate 204 and/or bottom plate 250 may bend, flex, or otherwise be distorted. For example, a force may arise between pole pieces 210 and 260 due to an induced magnetic pressure. That is, the passage of electrical current through wire coil 270 may cause the system to behave as an electromagnet with a split core, with portions (e.g., pole pieces 210 and 260) of the core attached to each plate.

A current in wire coil 270 may thus induce a magnetic field that causes pole pieces 210 and 260 to attract one another, and thus may cause top plate 204 and bottom plate 250 to be likewise attracted to one another. Through suitable regulation of the supplied voltage and/or current, this attractive force may result in vibration and seismic energy output. In this embodiment, the plates may bend, flex, or otherwise be distorted axially along axis 202. In some embodiments, the distortions may be axially symmetric or symmetric with respect to axis 202. According to one embodiment, a typical driving current may be approximately 5 A/mm$^2$, and the driving current may be AC or DC in different embodiments. According to some embodiments, a typical flux density of approximately 1 Tesla may be employed and may generate an attractive magnetic pressure of approximately 4 Bar between the plates of a marine seismic source. In general, various embodiments of this disclosure may typically provide flux densities in the range of approximately 0.5-2.2 Tesla and attractive magnetic pressure in the range of approximately 1-20 Bar.

According to some embodiments, it may be advantageous for groove 212 to be disposed in pole piece 210 (and correspondingly groove 262 in pole piece 260) such that the area of the pole piece that is inside the groove is equal (or approximately equal) to the area of the pole piece that is outside the groove. For example, the areas may in some embodiments advantageously be within 1%, within 2%, within 3%, within 4%, within 5%, within 10% of one another, etc. One possible reason for such an arrangement is that when the current in the wire coil is large, this arrangement may "spread out" the flux in a way that allows for a greater total flux without saturating the pole pieces. Accordingly, greater forces/pressures may be achieved.

Figure 3A:
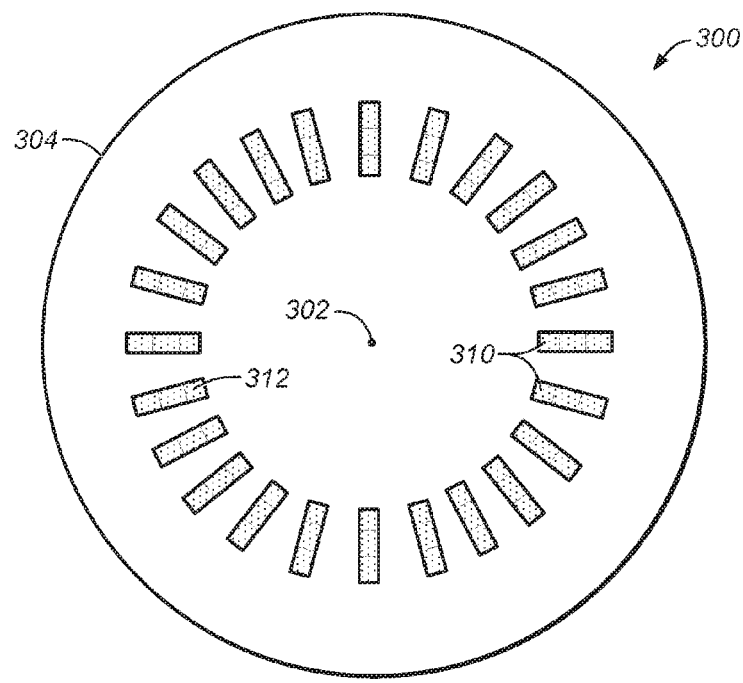
FIGS. 3A-3B illustrate a disassembled view of another embodiment of a marine seismic source according to this disclosure.
Figure 3B:
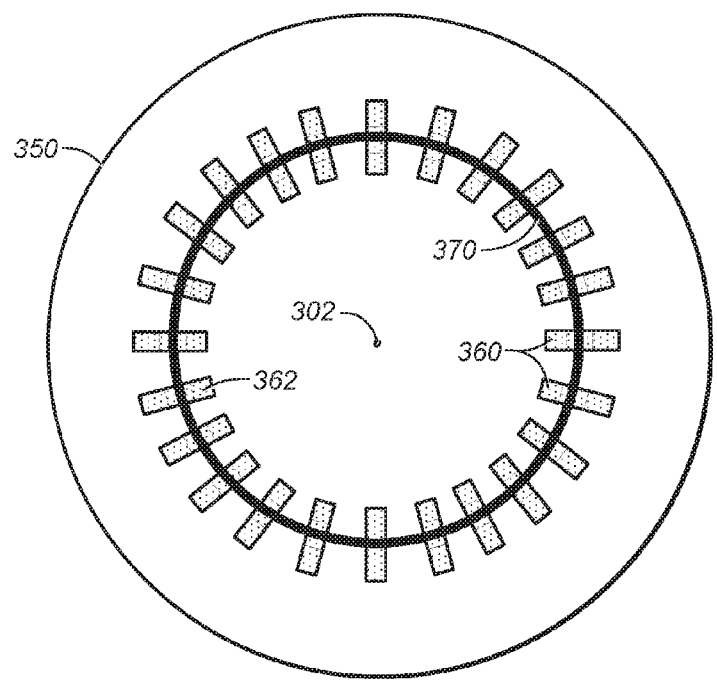

Turning now to FIGS. 3A and 3B, marine seismic source 300 is shown. Marine seismic source 300 is broadly similar to marine seismic source 200, but pole pieces 210 and 260 have each been replaced by a plurality of pole pieces 310 and 360, respectively. (In these Figures and others, similar reference numerals are given to corresponding components—e.g., top plate 204 corresponds to top plate 304, etc.) Similar to the grooves in marine seismic source 200, grooves 312 and 362 are disposed along these pluralities of pole pieces, and wire coil 370 runs through one or both of such grooves.

FIGS. 3A and 3B thus illustrate that devices according to this disclosure need not be limited to a single pole piece on each plate, but that any desired number and configuration of pole pieces may be used. For example, a larger number of smaller pole pieces may be more cost effective in some instances. In general, one or more pole pieces on each plate of a marine seismic source may be used.

As discussed above, embodiments of this disclosure rely on the magnetic reluctance force (also known as the magnetomotive force) to produce seismic energy. Without wishing to be limited by theory, in some embodiments the magnetic reluctance force may be briefly described as follows. Magnetic reluctance is an attractive force that tends to minimize air gaps in magnetic circuits. The magnitude of this force may depend on various physical properties of the components included in embodiments of this disclosure—e.g., area and magnetic reluctance of pole pieces, number of turns in wire coil, distance between pole pieces, etc.

The force provided by magnetic reluctance in some embodiments of marine seismic sources according to this disclosure may be given by the following equation:

$$F = \frac{\phi^2}{\mu_0 A_{gap}} = \left\{ \phi = \frac{IN}{R} \right\} = \frac{I^2 N^2}{R^2 \mu_0 A_{gap}} = \left\{ R = \frac{x}{\mu_0 A_{gap}} \right\} = \frac{I^2 N^2 \mu_0 A_{gap}}{x^2}$$

where
F=Attraction force [N]
ø=Total Magnetic Flux [Wb]
$\mu_0$=Permeability of vacuum $$\left[\frac{H}{m}\right]$$

$A_{gap}$=Cross sectional area of pole piece [m²]
I=Current in coil [A]
N=Number of turns in coil [-]
R=Ideal Reluctance of air gap $$\left[\frac{A}{Vs}\right]$$

x=Distance between pole pieces [m]

Accordingly, as described in more detail below, the attractive force between the plates of a marine seismic source according to this disclosure may be nonlinear, being proportional to the inverse square of the separation of the pole pieces.

Turning now to the issue of the amount of seismic energy produced, it is noted that a maximum sound pressure level of a marine seismic source may typically occur at or near a mechanical resonance frequency of the marine seismic source. Broadly speaking, sound pressure level is a difference, in a given medium, between a pressure associated with the seismic energy and an average local pressure. The square of this difference may be averaged over time and/or space, and a square root of this average may provide a root-mean-square (RMS) pressure value or $P_{rms}$. Sound pressure level is a logarithmic measure indicating a ratio of a given $P_{rms}$ relative to a reference sound pressure or $P_{ref}$. Sound pressure level is typically measured in decibels (dB). In marine applications, a reference pressure $P_{ref}$ is usually 1 micropascal (1 µPa). In mathematical terms, sound pressure level may be calculated by the equation below:

$$\text{Sound Pressure Level (dB)}=20 \log(P_{rms}/P_{ref})$$

One of ordinary skill in the art with the benefit of this disclosure will understand that the diameter, thickness, and material construction of top plate 204 and bottom plate 250 may advantageously be designed in order to achieve desirable operational characteristics (e.g., a resonance frequency in a selected range, such as 2-20 Hz). This may provide a sufficiently large sound pressure level in the frequency range of interest. According to one embodiment, the top plate and bottom plates may be approximately 450-700 mm in diameter. According to one embodiment, they may also be approximately 3-5 mm in thickness. Any suitable material may be used, such as aluminum, steel, other metals, alloys, composites, etc.

Figure 4:
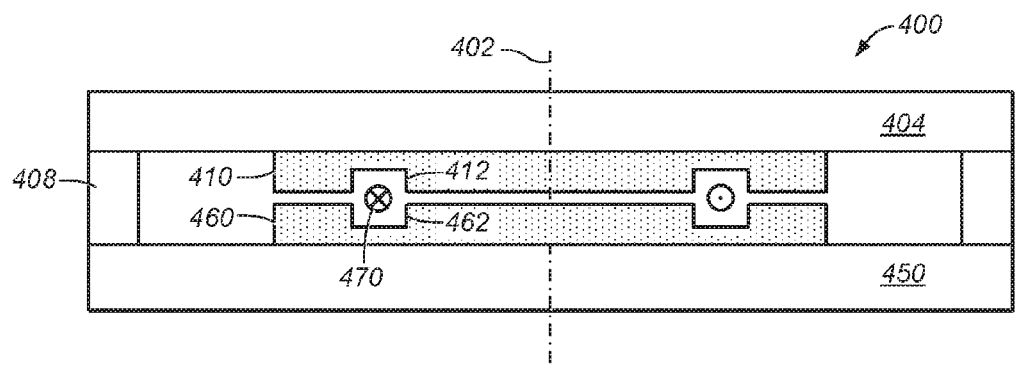
FIG. 4 illustrates a cross-sectional view of an embodiment of a marine seismic source according to this disclosure.

Turning now to FIG. 4, a cross-sectional view of an embodiment of marine seismic source 400 is shown. Marine seismic source 400 is arranged about axis 402, and it includes top plate 404 and bottom plate 450 separated by hoop 408. In this illustration, top plate 404 has attached thereto a single pole piece 410, and bottom plate 450 has attached thereto a single pole piece 460. Grooves 412 and 462 are respectively disposed within pole pieces 410 and 460, and wire coil 470 is disposed within one or both of those grooves. In the embodiment of FIG. 4, wire coil 470 is shown as "floating" between pole pieces 410 and 460; in other embodiments, however, it may be attached to one or both of pole pieces 410 and 460. The right side of wire coil 470 is shown in this embodiment as going "into the page," and the left side is shown is coming "out of the page"; this is to indicate the axial symmetry of the current that may be passed through wire coil 470.

One of ordinary skill in the art with the benefit of this disclosure will understand that the Figures are not necessarily drawn to scale, and will further recognize that the spacing between pole pieces 410 and 460 may advantageously be selected in order to produce the desired forces. Further, pole pieces 410 and 460 may in some embodiments advantageously be designed such that they do not come into physical contact with one another during normal operation of marine seismic source 400.

Figure 5:
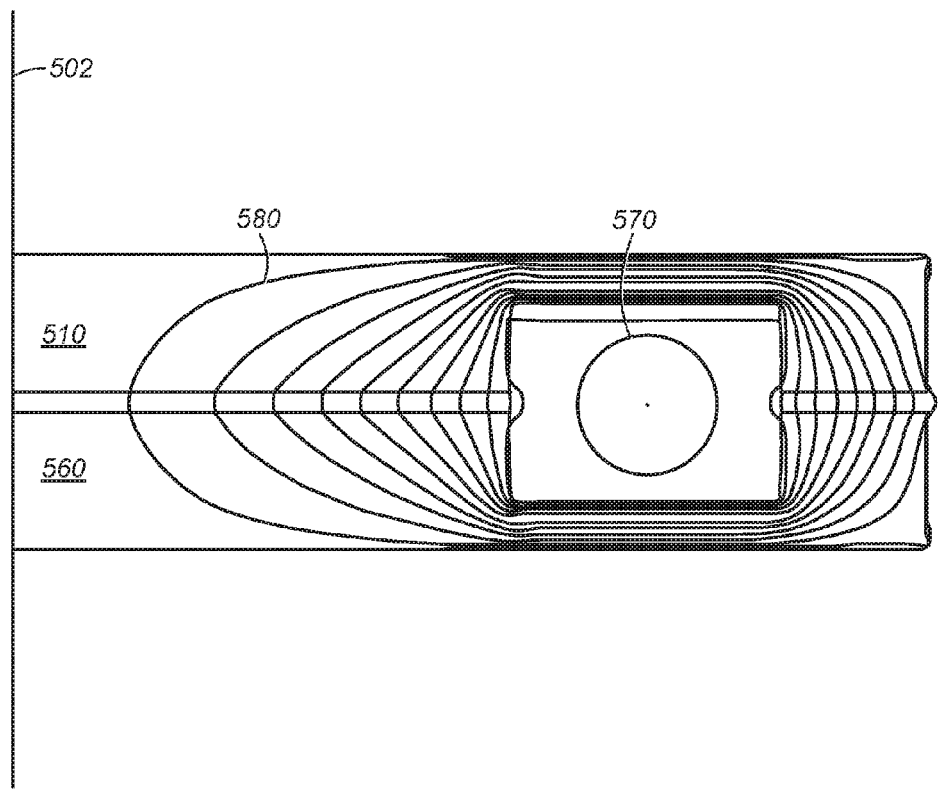
FIG. 5 illustrates a cross-sectional view of an embodiment of a portion of a marine seismic source according to this disclosure.

Turning now to FIG. 5, a cross-sectional detail view of a portion of a marine seismic source is shown. This marine seismic source is arranged about axis 502 and includes wire coil 570 and pole pieces 510 and 560. (Respective top and bottom plates are not shown in this illustration for the sake of simplicity.) When an electrical current is passed through wire coil 570, a magnetic field may be induced as shown at magnetic field lines 580. This magnetic field may provide an attractive force between pole pieces 510 and 560 and the respective top and bottom plates (not shown).

In FIG. 5, wire coil 570 is shown as a single wire of circular cross-section. One of ordinary skill in the art with the benefit of this disclosure will understand that in other embodiments, a plurality of wires may be used. For example, in some embodiments, a larger number of smaller wires may be used, substantially filing one or both of the grooves in the pole pieces.

Due (for example) to differences in mass between pole pieces and wire coils, it may sometimes be the case that the combined mass of one plate (that is, the mass of the plate plus the mass of any pole pieces, wire coils, and other components attached thereto) is larger than the combined mass of the opposite plate. In some cases, however, it may be advantageous for the plates of a marine seismic source according to this disclosure to have equal mass (or approximately equal mass, such as within 1% of one another, within 2% of one another, within 3% of one another, within 4% of one another, within 5% of one another, within 10% of one another, etc.). Equalizing the mass of the two plates may have advantageous effects on the sound pressure level, the resonance frequency, the frequency spectrum, and/or other characteristics of some embodiments of marine seismic sources according to this disclosure.

Although mass equalization may in some instances be achieved by simply adding mass to the lighter of the plates, it may also be achieved in some cases by arranging a marine seismic source according to this disclosure such that the plates themselves have approximately equal mass, and further such that the other components attached to each plate also have approximately equal mass. For example, if the wire coil is attached to the bottom plate, then the top plate (or pole piece attached thereto) may be designed with a somewhat higher mass to account for the mass of the wire coil.

As noted above, the magnetic reluctance forces between the pole pieces according to this disclosure are typically attractive forces. Accordingly, in some embodiments, it may additionally be advantageous to provide a repulsive force that may partially counteract such forces—e.g., to provide a force that will resist the attractive magnetic reluctance force. For example, such a repulsive force may act on the pole pieces, and/or on the top and bottom plates themselves. By varying the current provided to the wire coil in the presence of such a repulsive force, an oscillating motion may be established to provide seismic energy. There are many ways of providing such a repulsive force, and the following discussion provides a few examples. One of ordinary skill in the art with the benefit of this disclosure will of course envision many possible variations on ways of providing a repulsive force to resist the attractive magnetic reluctance force. These may in various embodiments be used in isolation or in combination with one another.

With momentary reference back to FIG. 4, one example of a way of providing resistance to the attractive magnetic reluctance force is to use the stiffness of various components to provide an effective spring force opposing the magnetic reluctance force. For example, the thickness and arrangement of top and bottom plates 404 and 450, as well as hoop 408 may be selected in order to produce a desired force and/or a desired equilibrium separation distance between the pole pieces. The thickness and arrangement of pole pieces 410 and 460 may also in some embodiments contribute to this force, and thus their design may also be determined with regard to the desired force. According to some embodiments, the equilibrium separation of the pole pieces may be selected such that they are sufficiently close to allow the magnetic reluctance force to dominate the spring force at acceptable current levels, but sufficiently far that they do not contact one another during normal operation. For example, in some embodiments, an equilibrium separation of approximately 0.5-5 mm may be used.

Another way of providing a repulsive force in some embodiments is to pressurize the interior of marine seismic source 400 (e.g., with air, nitrogen, or some other suitable gas). For example, a pressure in the range of 1-12 Bar may provide a suitable force or pressure between top plate 404 and bottom plate 450 of marine seismic source 400.

Figure 6:
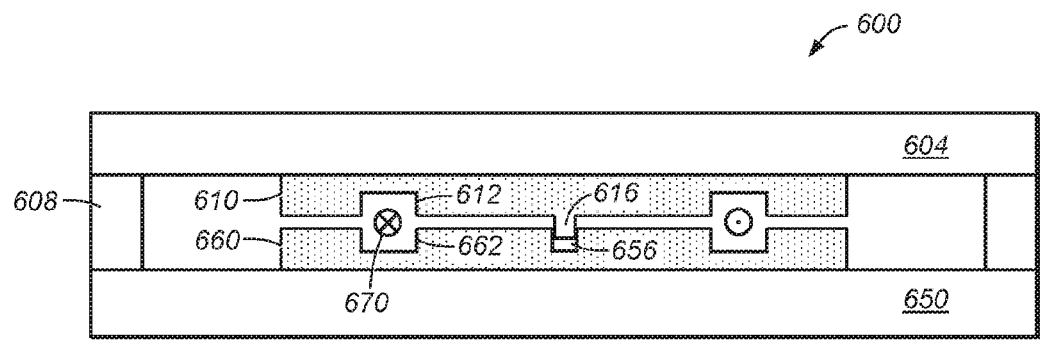
FIG. 6 illustrates an embodiment of a marine seismic source according to this disclosure.

Turning now to FIG. 6, marine seismic source 600 is shown. Marine seismic source 600 is broadly similar to marine seismic source 400, but with additional structures to provide a repulsive force between top plate 604 and bottom plate 650. Pole piece 660 includes cylinder 656, and pole piece 610 includes gas piston 616, which fit together in operation to trap air (or other gas). As the plates move together, the air in cylinder 656 becomes increasingly compressed, providing a repulsive force. One of ordinary skill in the art with the benefit of this disclosure will understand that the size of cylinder 656 and gas piston 616 may be selected to provide the desired amount of force. This repulsive force may be used to prevent the pole pieces from contacting each other in operation, and they may also be used to compensate partially for the non-linear properties of the system (described in more detail below with reference to FIG. 9).

Figure 7:
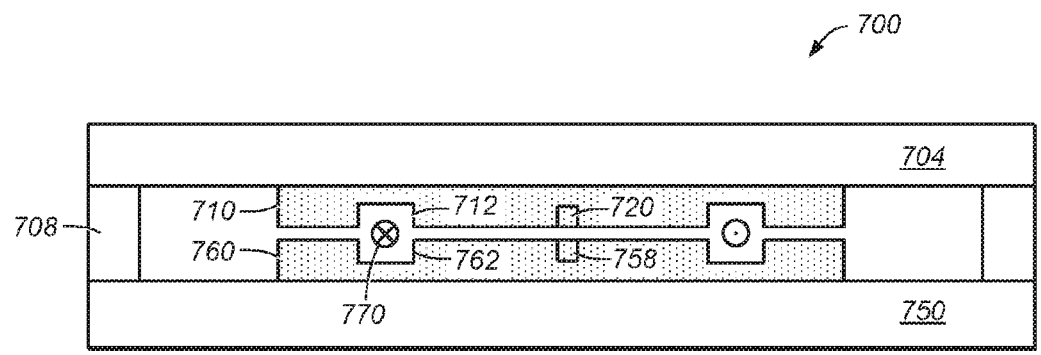
FIG. 7 illustrates an embodiment of a marine seismic source according to this disclosure.

Turning now to FIG. 7, marine seismic source 700 is shown. Marine seismic source 700 is broadly similar to marine seismic source 600, but with a different way of providing a repulsive force between top plate 704 and bottom plate 750. Pole pieces 710 and 760 include magnets 720 and 758, respectively. Magnets 720 and 758 may be arranged with opposite polarity in order to provide a repulsive force, e.g., for the purposes described above. In some embodiments, however, they may be arranged with the same polarity to provide an attractive force. This may be used, for example, to identify a desired value for the equilibrium spacing between pole pieces 710 and 760.

Figure 8:
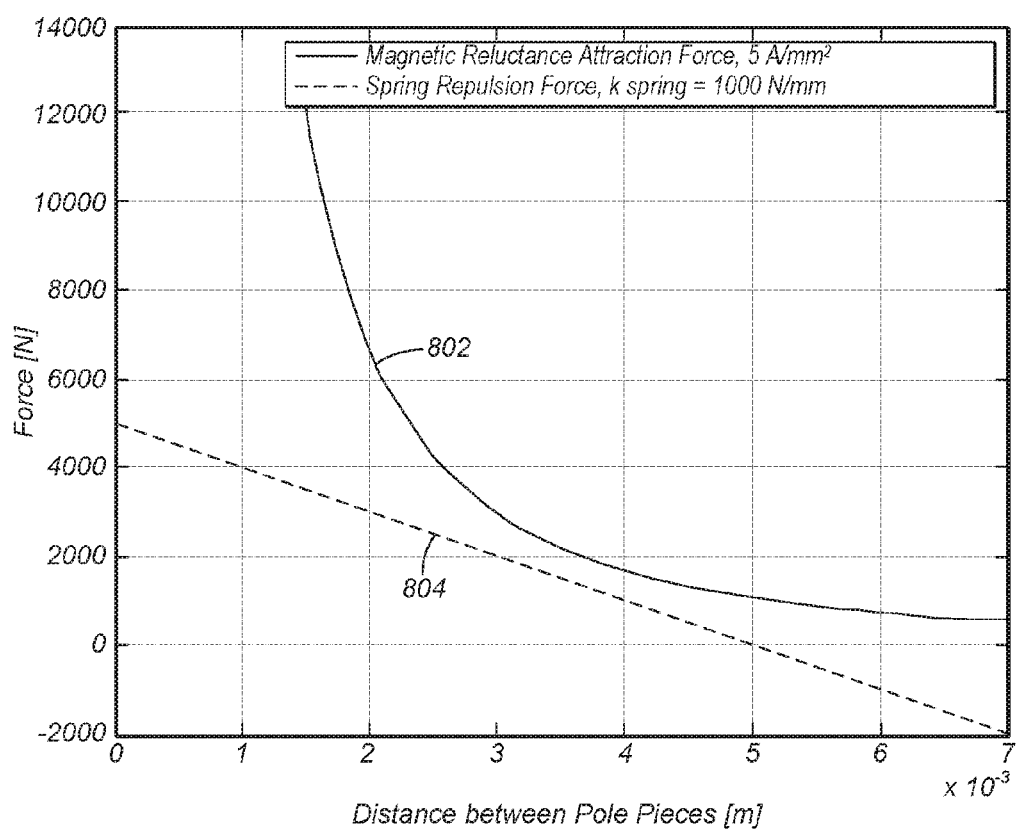
FIGS. 8-9 illustrate graphs related to some embodiments of this disclosure.

Turning now to FIG. 8, a graph is shown that illustrates the forces between the plates of an embodiment of a marine seismic source according to this disclosure. Magnetic reluctance force 802 (which is attractive) is shown, as well as spring force 804 (which is repulsive). This embodiment relies solely on the spring force to provide repulsive force between the plates, as described above. As shown, the equilibrium separation between the pole pieces (the position at which spring force 804 is zero, and so the resting position at zero current) is about 5 mm. In this example, the effective spring constant is k=1 mm/kN, but one of ordinary skill in the art with the benefit of this disclosure will understand that any desired spring constant may be used to achieve the desired system characteristics.

In this example, the other mechanical properties of the device are generally as follows:

TABLE 1

| Pole piece radius | 101 mm |
| Pole piece height | 40 mm |
| Coil inner radius | 55 mm |
| Coil outer radius | 85 mm |
| Coil height | 20 mm |
| Total weight | 10 kg |

FIG. 8 shows that the magnetic reluctance force may be nonlinear as a function of the distance between the pole pieces. That is, as the pole pieces get closer together, the strength of the interaction may increase very quickly. As discussed above, in some embodiments, the strength may be inversely proportional to the second power of the separation.

FIG. 8 shows the magnetic reluctance interaction at a constant current of 5 $A/mm^2$, but one of ordinary skill in the art with the benefit of this disclosure will recognize that this need not be the case. It may be advantageous to employ a control system that (for example) reduces the current level as the pole pieces approach one another in order to counteract the nonlinearity of the interaction. Control systems may also be utilized to account for the magnetic hysteresis of the pole pieces (e.g., the non-zero time required for magnetic flux to change in response to a change in current). Some embodiments are described in more detail below.

The system illustrated in FIG. 8 has been designed such that the amount of available attractive magnetic reluctance force is greater than the repulsive spring force. This may be advantageous, because it means that the entire range of separations below the equilibrium separation of 5 mm is accessible to this marine seismic source. If the spring force were greater than the available magnetic reluctance force, then there may be regions that could not be reached.

Figure 9:
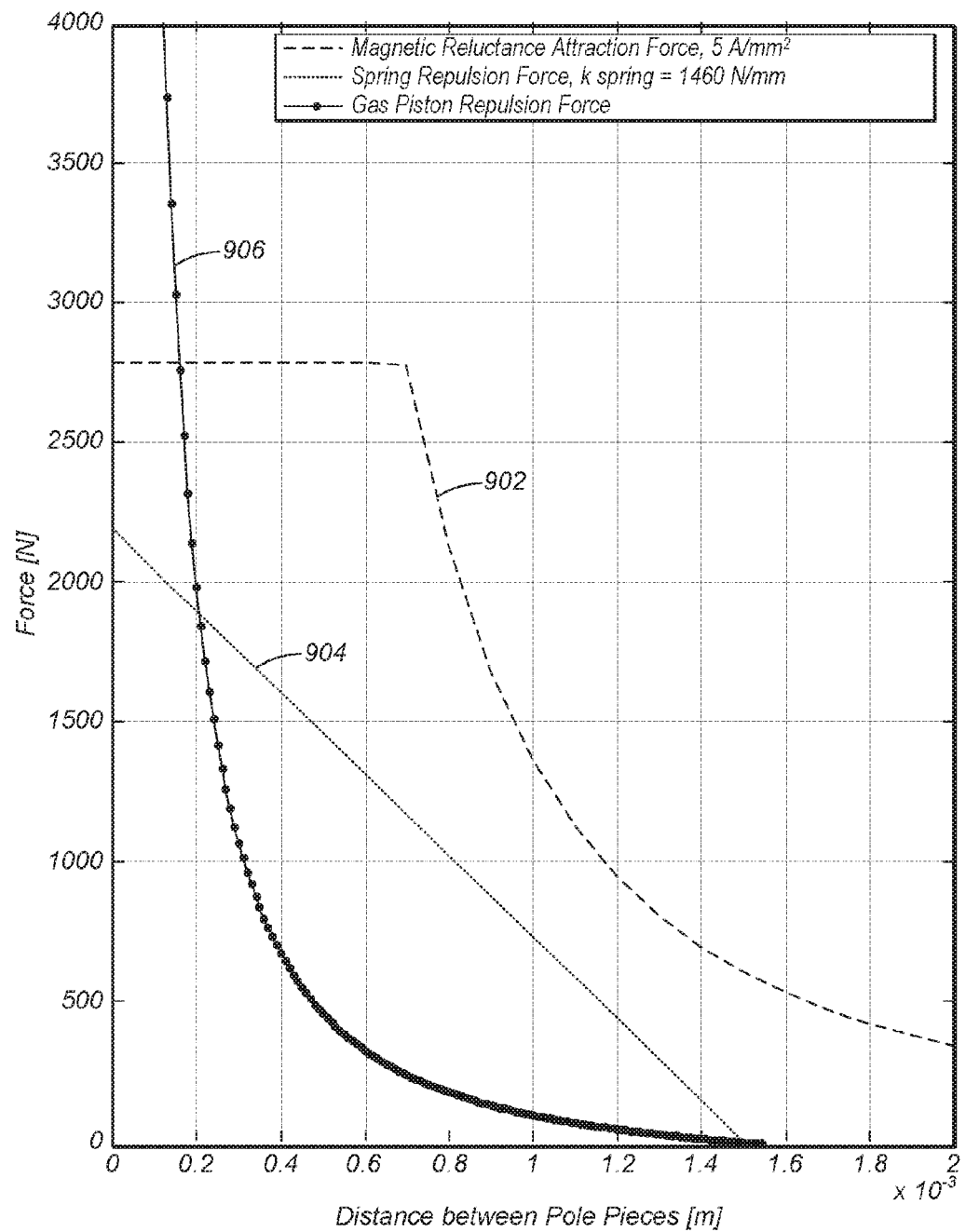

Turning now to FIG. 9, an additional graph is shown that illustrates the forces between the plates of a different embodiment of a marine seismic source according to this disclosure. This embodiment relies on both the spring force and a gas piston (as shown in FIG. 6) to provide a repulsive force between the plates. Magnetic reluctance force 902 (which is attractive) is shown, as well as spring force 904 and gas piston force 906 (which are repulsive). In this example, the equilibrium separation between the pole pieces is about 1.5 mm.

As shown in FIG. 9, the nonlinear repulsive force of the gas piston may advantageously be combined with the nonlinear attractive magnetic reluctance force. That is, by selecting an appropriately sized gas piston, the rapid increase of the attractive force as the pole pieces approach one another may (at least partially) be counterbalanced by the rapid increase of the repulsive force as the gas is pressurized in the gas piston.

In order to compensate for the nonlinearities of the electromagnet, in some embodiments, a marine seismic source may be designed such that its inherent spring constant increases with deflection. Such progressive spring characteristics may be achieved, for example, by shaping the marine seismic source and choosing the material properties of the benders for that purpose.

According to some embodiments, various types of control systems may also be used to account for the nonlinearities and/or magnetic hysteresis effects that may arise in marine seismic sources according to this disclosure. For example, Iterative Learning Control (ILC) controllers are known in the art to be useful in the context of reluctance actuators. Various other types of controllers are also known in the art for dealing with nonlinearities, hysteresis effects, etc. One of ordinary skill in the art with the benefit of this disclosure will understand that any of various types of control systems may advantageously be employed.

Figure 10:
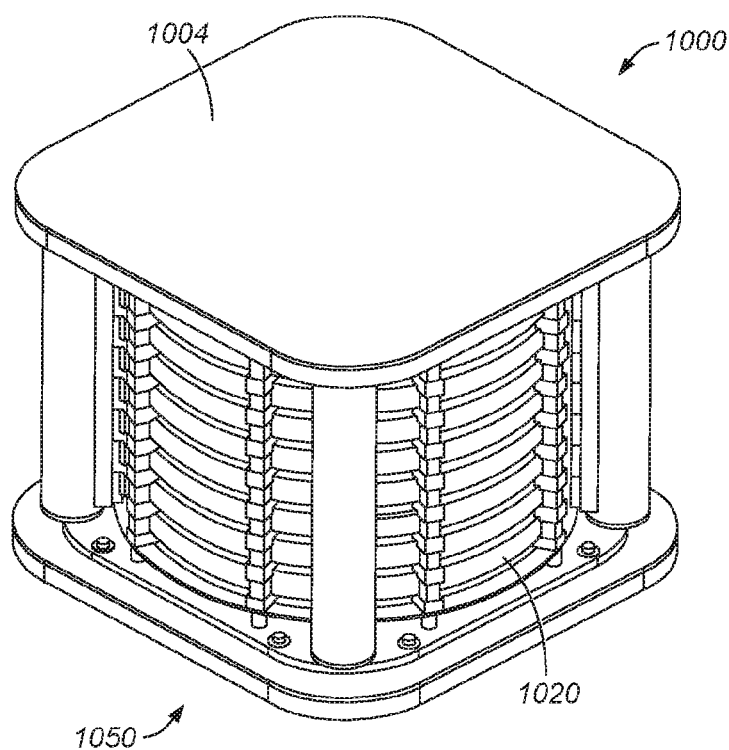
FIG. 10 illustrates an embodiment of a marine seismic source according to this disclosure.

Turning now to FIG. 10, an embodiment is illustrated in which an array of several individual marine seismic sources 1020 may be arranged inside a housing into stack assembly 1000. Although the individual marine seismic sources 1020 are capable of providing seismic energy, it may be advantageous to combine them in some embodiments into a stack such as stack assembly 1000. Such an arrangement may in some instances be used to increase the total sound pressure level achievable, relative to what may be achievable via a single marine seismic source 1020. In one embodiment, stack assembly 1000 may include marine seismic sources 1020 in a series configuration. In other embodiments, parallel configurations are possible, as well as embodiments that incorporate both series and parallel components. Stack assembly 1000 may include top plate 1004 and bottom plate 1050 to which marine seismic sources 1020 may be secured.

Figure 11:
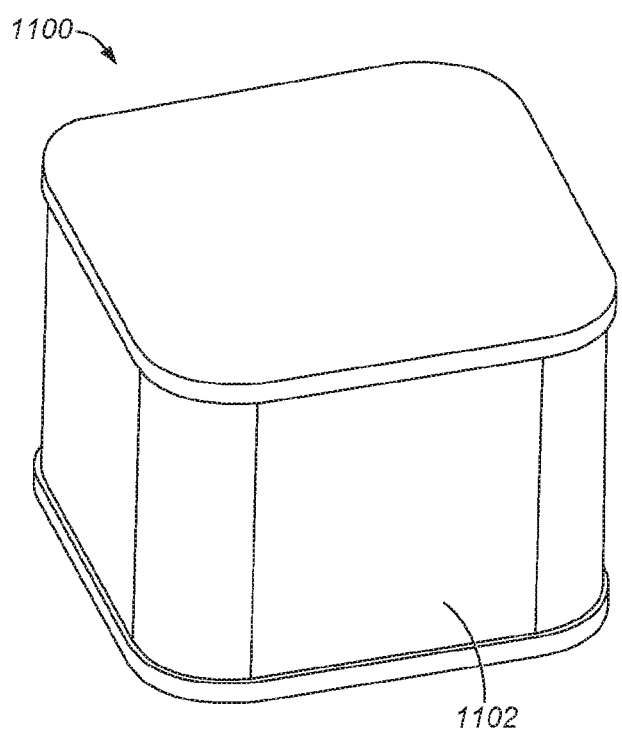
FIG. 11 illustrates an embodiment of a marine seismic source according to this disclosure.

FIG. 11 illustrates yet another embodiment of a stack assembly in which stack assembly 1100 additionally includes boot assembly 1102. Boot assembly 1102 may enclose and/or be disposed around the individual marine seismic sources shown in FIG. 10, for example. In one particular embodiment, boot assembly 1102 may include a liquid (in some cases, an electrically insulating material such as an electrically insulating oil may be used) in which the individual marine seismic sources may be immersed or at least partially disposed. This liquid may serve as an additional protective layer for the individual marine seismic sources, and it may also provide a medium through which seismic energy is transmitted.

Figures 12, 13:
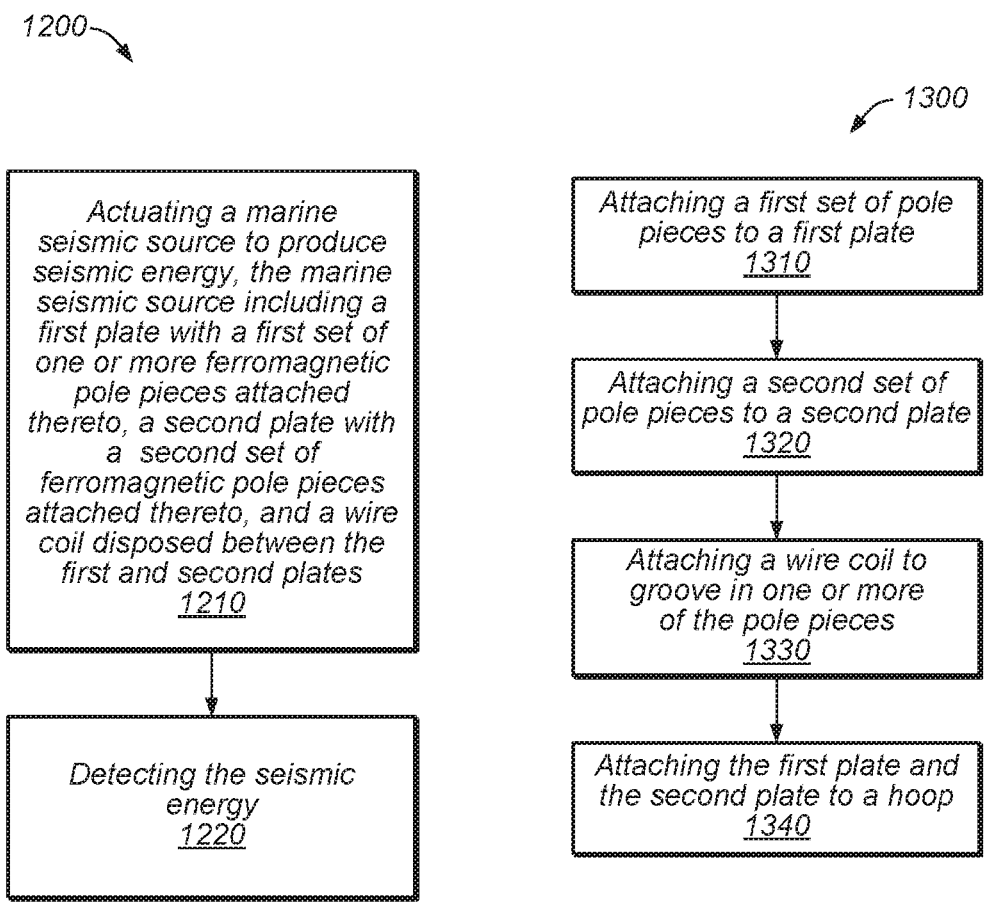
FIGS. 12-13 illustrate embodiments of methods according to this disclosure.

Turning now to FIGS. 12 and 13, flow diagrams are presented in accordance with aspects of this disclosure. It should be understood that in some embodiments, fewer than all steps of a particular process flow may be performed in accordance with this disclosure. Further, it should be understood that in some embodiments, steps may be performed in a different order.

FIG. 12 is a flow diagram illustrating an embodiment of a method 1200 of operating an apparatus according to this disclosure. Flow begins at block 1210, in which a marine seismic source is actuated to produce seismic energy. For example, the marine seismic source may be a single source (e.g., an individual bender), or in some embodiments it may be an array of such single sources.

The marine seismic source includes (at least) a first plate having a first set of one or more pole pieces attached thereto, a second plate having a second set of one or more pole pieces attached thereto, and a wire coil disposed between the first and second plates. For example, as shown in some examples above, the wire coil may be disposed in one or more grooves in the pole pieces.

The plates may be similar to the various top plates and bottom plates described above. If the marine seismic source includes an array of single sources, then it is contemplated that more than one source in the array of sources may include first and second plates, and corresponding sets of one or more pole pieces. For example, each source in the array may be substantially similar to the others in the array. Various examples of suitable configurations have been described above. Flow proceeds to block 1220.

At block 1220, the seismic energy is detected. This may be accomplished via any of various types of sensors, such as hydrophones, geophones, accelerometers, etc. The sensors may be located on streamers towed by a survey vessel, on ocean bottom cables, ocean bottom nodes, or otherwise disposed in the body of water or subsurface formation. Further, the seismic energy may in some embodiments be detected after it has interacted with various subsea formations. Flow ends at block 1220.

FIG. 13 is a flow diagram illustrating an embodiment of a method 1300 for making an apparatus in accordance with this disclosure. Flow begins at block 1310, in which a first set of one or more pole pieces is attached to a first plate. The first set may generally include one or more pole pieces. Flow proceeds to block 1320.

At block 1320, a second set of one or more pole pieces is attached to a second plate. The second set may also generally include one or more pole pieces. Flow proceeds to block 1330.

At block 1330, a wire coil is attached to a groove in one or more of the pole pieces. For example the wire coil may be disposed entirely in a groove in the first set, entirely in a groove in the second set, or partially in a groove in the first set and partially in a groove in the second set. Flow proceeds to block 1340.

At block 1340, the first plate and the second plate are attached to a hoop. The hoop may in some instances be an annular element extending around a circumference of the first and second plates. The plates may be attached to the hoop via, for example, a plurality of bolts. Flow ends at block 1330.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   actuating a marine seismic source to produce seismic energy, the actuating by:
   passing electric current through a wire coil disposed in a first groove defined in a first pole piece, the first pole piece coupled to a first plate that defines a first central axis and a first outer edge;
   attracting a second pole piece toward the first pole piece, the second pole piece coupled to a second plate that defines a second central axis and a second outer edge, the first central axis coaxial with the second central axis, and the first plate parallel to the second plate;

bending the first and second plates toward each other along the first and second central axis; and maintaining separation of the outer edges of the first and second plates by way of a hoop disposed between the first and second plates at the outer edges; and detecting the seismic energy.

2. The method of claim 1, further comprising towing the marine seismic source behind a survey vessel in a body of water.

3. The method of claim 2, wherein the marine seismic source is towed at a depth of between 35 and 190 meters.

4. The method of claim 1, further comprising recording the detected energy on a tangible, non-volatile computer-readable medium.

5. The method of claim 1, wherein the actuating includes actuating a plurality of marine seismic sources.

6. The method of claim 5, wherein the plurality of marine seismic sources are arranged in a series configuration.

7. The method of claim 1, wherein passing electric current through the wire coil further comprises passing electric current through the wire coil disposed in the first groove of the first pole piece being a ferromagnetic pole piece.

8. The method of claim 1, wherein actuating the marine seismic source to produce seismic energy further comprises producing seismic energy within a frequency range of 2 Hz to 20 Hz at a water depth in a range of 15 to 190 meters.

9. The method of claim 1, wherein actuating the marine seismic source to produce seismic energy further comprises producing seismic energy within a frequency range of 2 Hz to 10 Hz at a water depth in a range of 35 to 190 meters.

10. The method of claim 1, wherein bending the first and second plates toward each other further comprises bending with a combined mass of the first plate and the first pole piece within 5% of a combined mass of the second plate and the second pole piece.

11. The method of claim 1, further comprising:

ceasing the flow the electric current through the wire coil;

separating the first and second plates along the first and second central axis such that the first and second pole pieces have a separation in the range of 0.5 to 5 mm, the separating by stiffness of the first and second plates.

12. The method of claim 1, further comprising:

repelling a second pole piece away from the first pole piece;

bending the first and second plates away from each other along the first and second central axis; and maintaining separation of the outer edges of the first and second plates by way of the hoop.

13. The method of claim 12, further comprising repelling the first and second plates by way of a plurality of permanent magnets coupled to the first and second plates.

14. The method of claim 1 wherein passing electric current further comprises passing electric current through the wire coil disposed in the first groove defined in a first pole piece coupled to the first plate, the first plate is circular.

15. An apparatus, comprising:

a marine seismic source that includes:

a first plate that defines a first central axis and a first outer edge;

a second plate that defines a second central axis and a second outer edge, the first central axis is coaxial with the second central axis, and the first plate is parallel to the second plate;

a hoop disposed between the first and second plates at the outer edges of the first and second plates;

an interior cavity defined between the first plate, the second plate, and the hoop;

a first pole piece coupled to the first plate, the first pole piece within the interior cavity;

a first groove defined in the first pole piece;

a second pole piece coupled to the second plate, the second pole piece within the interior cavity;

a wire coil disposed in the first groove between the first and second plates such that the first and second pole pieces are configured to attract one another when an electric current is passed through the wire coil such that the first and second plates bend toward each other along the coaxial first and second central axis.

16. The apparatus of claim 15 wherein at least one of the pole pieces comprises a ferromagnetic pole piece.

17. The apparatus of claim 15, wherein the marine seismic source is configured to produce seismic energy within a frequency range of 2 Hz to 20 Hz at a water depth in a range of 15 to 190 meters.

18. The apparatus of claim 17, wherein the seismic energy is within a frequency range of 2 Hz to 10 Hz at a water depth in a range of 35 to 190 meters.

19. The apparatus of claim 15, wherein a combined mass of the first plate and the first pole piece is within 5% of a combined mass of the second plate and the second pole piece.

20. The apparatus of claim 15, wherein, in the absence of the electric current, a stiffness of the first and second plates provides a selected separation in the range of 0.5 to 5 mm between the first and second pole pieces.

21. The apparatus of claim 15, wherein the first plate is circular, and the second plate is circular.

22. The apparatus of claim 15, further comprising a means for providing a repulsive force between the first and second plates.

23. The apparatus of claim 22, wherein the interior cavity is pressurized at a selected pressure in the range of 1-12 Bar, and wherein the selected pressure is operable to provide the repulsive force between the first and second plates.

24. The apparatus of claim 22, further comprising a plurality of permanent magnets operable to provide the repulsive force between the first and second plates.

25. The apparatus of claim 22, further comprising at least one gas piston disposed between the first and second pole pieces, wherein the at least one gas piston is configured to provide the repulsive force between the first and second plates.

26. A method of manufacturing a geophysical data product, the method comprising:

obtaining geophysical data by actuating a marine seismic source to produce seismic energy, the actuating by:

passing electric current through a wire coil disposed in a first groove defined in a first pole piece, the first pole piece coupled to a first plate that defines a first central axis and a first outer edge;

attracting a second pole piece toward the first pole piece, the second pole piece coupled to a second plate that defines a second central axis and a second outer edge, the first central axis coaxial with the second central axis, and the first plate parallel to the second plate;

bending the first and second plates toward each other along the first and second central axis; and maintaining separation of the outer edges of the first and second plates by way of a hoop disposed between the first and second plates at the outer edges; and recording the geophysical data on a tangible computer-readable medium.

\* \* \* \* \*